(12) United States Patent
Collins et al.

(10) Patent No.: US 10,646,943 B2
(45) Date of Patent: May 12, 2020

(54) METHOD OF FORMING ELECTRICAL CONNECTIONS USING OPTICAL TRIGGERING FOR SOLDER

(71) Applicant: Seagate Technology LLC, Cupertino, CA (US)

(72) Inventors: Aaron Michael Collins, Minneapolis, MN (US); Scott Daemon Matzke, Shakopee, MN (US); Paul Davidson, Eden Prairie, MN (US); Christopher R. Libby, St. Paul, MN (US)

(73) Assignee: Seagate Technology LLC, Fremont, CA (US)

( * ) Notice: Subject to any disclaimer, the term of this patent is extended or adjusted under 35 U.S.C. 154(b) by 623 days.

(21) Appl. No.: 15/361,714

(22) Filed: Nov. 28, 2016

(65) Prior Publication Data

US 2018/0147646 A1 May 31, 2018

(51) Int. Cl.
*B23K 1/005* (2006.01)
*H01R 43/02* (2006.01)
(52) U.S. Cl.
CPC ....... *B23K 1/0056* (2013.01); *H01R 43/0221* (2013.01)

(58) Field of Classification Search
CPC .. G11B 5/4826; G11B 5/4853; B23K 1/0056; H01R 43/0221
See application file for complete search history.

(56) References Cited

U.S. PATENT DOCUMENTS

| 7,717,316 | B2 | 5/2010 | Azdasht et al. |
| 7,765,678 | B2 | 8/2010 | Yamaguchi et al. |
| 8,881,967 | B2 * | 11/2014 | Matsumoto .......... B23K 1/0016 228/245 |
| 2013/0256281 | A1 | 10/2013 | Tsuchiya et al. |
| 2016/0354853 | A1 * | 12/2016 | Azdasht ............... B23K 1/0056 |

* cited by examiner

*Primary Examiner* — Livius R. Cazan
(74) *Attorney, Agent, or Firm* — Kagan Binder, PLLC

(57) ABSTRACT

A method for interconnecting multiple components of an electrical assembly with a solder joint, including the steps of positioning a first component adjacent to a second component to provide a connection area, dispensing a solid solder sphere to a capillary tube, wherein the capillary tube is positioned with an exit orifice above the connection area between the first and second components, applying a first laser through the capillary tube while measuring light from the first laser that reflects off the connection area as the solder sphere moves through the capillary tube, and applying a second laser to at least partially melt the solder sphere when the measured light decreases to a predetermined level and as the solder sphere falls from the exit orifice toward the connection area between the first and second components.

15 Claims, 5 Drawing Sheets

- - - - - PRESSURE
———— LASER INTENSITY

- - - - - OPTICAL DETECTION
───── LASER INTENSITY
·········· LOW TRIGGER THRESHOLD

METHOD OF FORMING ELECTRICAL CONNECTIONS USING OPTICAL TRIGGERING FOR SOLDER

BACKGROUND

Hard disk drive (HDD) systems typically include one or more data storage disks with concentric tracks containing information. A transducing head carried by a slider is used to read from and write to a data track on one of these disks, wherein each slider has an air bearing surface that is supportable by a cushion of air generated by one of the disks as it is rotating. The slider is carried by an arm assembly that includes an actuator arm and a suspension assembly, which can include a separate gimbal structure or can integrally form a gimbal.

The manufacturing of components of HDD systems often includes providing an electrical connection via solder material between a slider and the transmission lines of the suspension, either by direct connection between such component surfaces, or by connecting bonding pads attached to at least one of the component surfaces. Such a process typically involves depositing a solder ball between bonding pads of a slider and bonding pads of suspension, and then reflowing the solder with a laser beam. As the density of data to be stored on disks continues to increase, more precise positioning and processing of the solder material is becoming increasingly important.

One particular current process for connecting components of an HDD system involves the use of a single square wave laser pulse that is applied to a solder ball, with the amount of laser energy applied by the single pulse being balanced to provide for both the thermal energy for initial melting of the solder sphere as well as the desired amount of thermal energy for reflow of the solder to provide a satisfactory connection between components. The use of such a single high intensity pulse results in the total thermal energy put into the solder sphere occurring in a relatively short time period (typically while still in a capillary and/or shortly after exiting the capillary). This can cause a considerable amount of heat to be conducted into the capillary wall. Additionally, since the reflow energy is put into the solder sphere as thermal energy, the final sphere temperature is far greater than that of the required melt temperature, which can cause an undesirable amount of localized heat to transfer to a slider or other component when it impacts the surface. While a number of other processes are also available, there is a desire to provide additional solder placement techniques that allow for accurate solder connections in high density applications without adverse consequences to the slider, suspension, and/or other HDD system components.

SUMMARY

Aspects of the invention described herein are directed to the processing of solder materials to provide for accurate attachment and interconnect of sliders to their associated head gimbal assemblies in hard disk drives. Such methods and configurations are particularly beneficial with the continuing desire to decrease the size of electronic components in the data storage industry. In particular, aspects of the invention are directed to using optical detection to locate a solder sphere as it falls from a capillary toward a solder area and triggering a laser to melt and reflow the solder while it falls to the solder area. In embodiments of the invention, the solder will only come into minimal contact with the inner portion of the capillary as it travels to the solder area, and in additional embodiments of the invention, the solder will not come into contact with the inner portion of the capillary.

In one aspect of the invention, a method is provided for interconnecting multiple components of a head-gimbal assembly with a solder joint, including the steps of positioning a first component adjacent to a second component to provide a connection area between the first and second components, and dispensing a solid solder sphere to an inner portion of a capillary tube comprising a top portion and a bottom portion extending downwardly from the top portion, wherein the capillary tube is positioned with an exit orifice above the connection area between the first and second components. The method further includes the steps of applying a first laser through the capillary tube while measuring light from the first laser that reflects off the connection area as the solder sphere moves through the capillary tube, and applying a second laser to at least partially melt the solder sphere when the measured light decreases to a predetermined level and as the solder sphere falls from the exit orifice toward the connection area between the first and second components.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
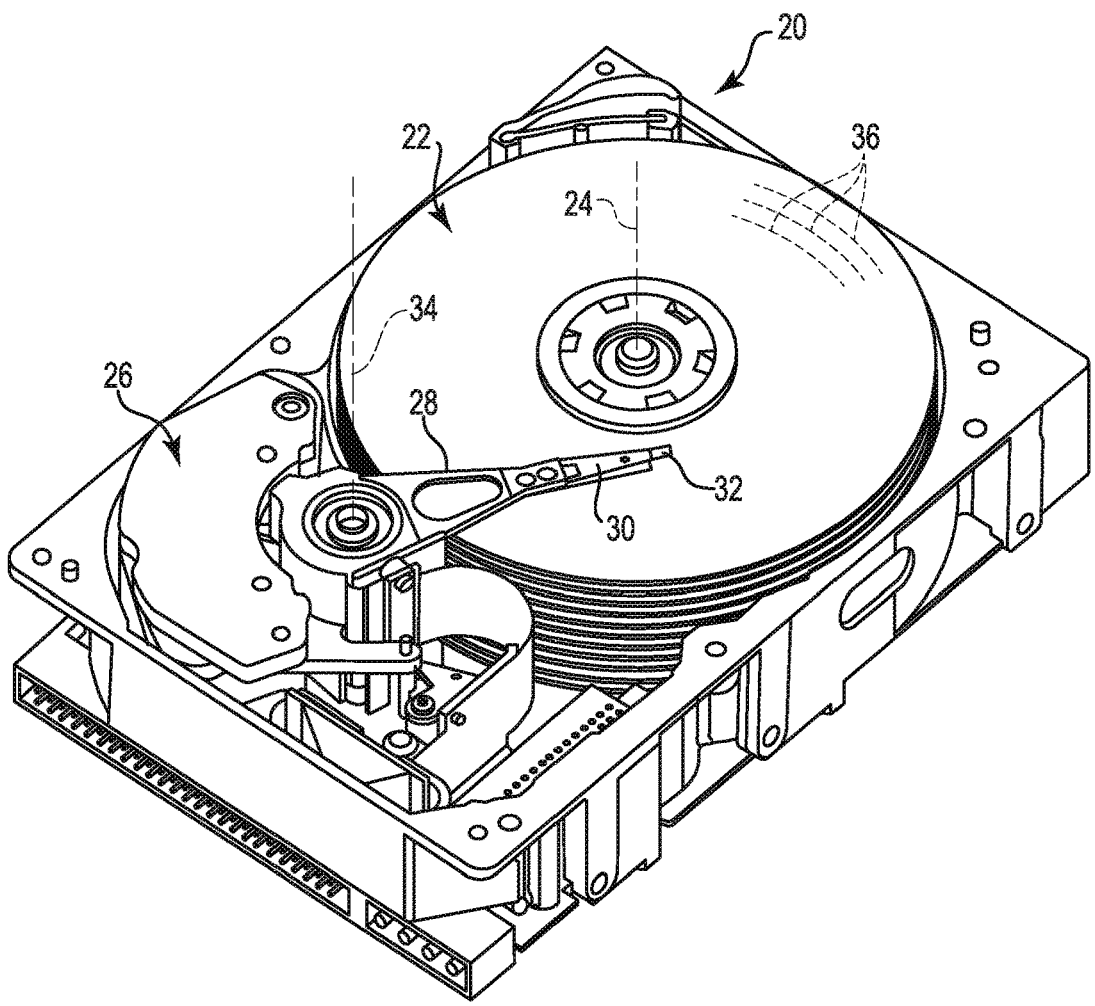
FIG. 1 is a perspective view of an exemplary hard disk drive (HDD) system.

Referring now to the Figures, wherein the components are labeled with like numerals throughout the several Figures, and initially to FIG. 1, an exemplary configuration of a typical hard disk drive (HDD) system 20 is illustrated. The HDD system generally includes at least one magnetic storage disk 22 configured to rotate about an axis 24, an actuation motor 26 (e.g., a voice coil motor), an actuator arm 28, a suspension assembly 30 that includes a load beam, a slider 32 carrying a transducing or read/write head (not shown). Slider 32 is supported by suspension assembly 30, which in turn is supported by actuator arm 28. Together, actuator arm 28, suspension assembly 30 and slider 32 form a head stack assembly (HSA). Actuation motor 26 is configured to pivot actuator arm 28 about an axis 34, in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a piezoelectric microactuator, not seen in FIG. 1. A stack of co-rotating disks 22 can be provided with additional actuator arms 28, suspension assemblies 30, and sliders 32 that carry read/write heads for reading and writing at top and bottom surfaces of each disk 22 in the stack.

The read/write heads described above are carried by a slider that is used to read from and write to a data track on a disk. The slider is carried by an arm assembly that includes an actuator arm and a suspension assembly, which can include a separate gimbal structure or can integrally form a gimbal. In a typical process, an array of sliders are formed on a common substrate or an AlTiC wafer which is then sliced to produce bars, with a row of sliders in a side-by-side pattern on each bar. The bars (which can be referred to as row bars) are then subjected to a series of processes to form individual sliders, including lapping, cleaning, formation of air-bearing surfaces (ABS), and dicing.

Figure 2:
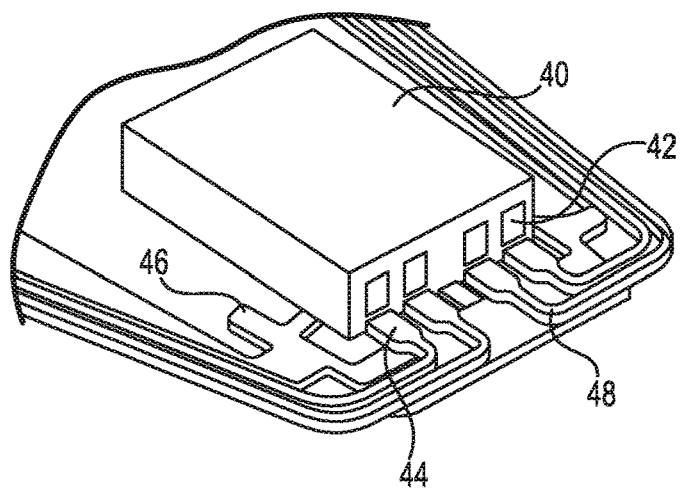
FIG. 2 is a perspective view of the front end of a slider having slider bonding pads on one of its faces as positioned adjacent to suspension bonding pads, wherein the bonding pads of the slider and suspension are not yet interconnected.

FIG. 2 is a front perspective view of the front end of a slider 40 having slider bonding pads 42 on a front face thereof, wherein the slider bonding pads 42 are adjacent to suspension bonding pads 44. This configuration represents the configuration prior to the connection of the bonding pads to each other to provide the desired electrical interconnection between components. The suspension assembly 30 of FIG. 1 is formed by attaching a gimbal 46 on a load beam in the area where the slider 40 is supported. The load beam will provide a spring-type function for generating a load that is balanced with the lift on the slider 40. The gimbal 46 further supports the slider 40 in such a way that it allows for a position change of the slider 40 during operation thereof.

As is further shown in FIG. 2, the interconnection area of the slider 40 includes multiple leads or traces 48 that extend from a proximal area of the device that can include a preamplifier, for example, to a distal end that includes the suspension bonding pads 44. Although this figure illustrates four of each of the suspension bonding pads 44 and the slider bonding pads 42 to make up four pairs of areas for interconnection, it is understood that greater or less than four of such pairs can be provided in contemplated configurations of hard disk drives, wherein greater than four of such pairs will typically be provided. In fact, the desire to provide improvement in interconnection techniques, as discussed herein, can be driven generally by the need to provide many more than four of such interconnections for a particular slider/suspension attachment.

In accordance with methods of the invention, an exemplary thermal interconnect process is provided in which a first laser is used to produce illumination for solder sphere detection and a second coaxial laser is used to provide the necessary heat for melting and reflowing the solder sphere on a target surface. In order to detect the location of the sphere as it is moving through a capillary, a photodetector is positioned outside the capillary to measure light being provided by the first laser and reflected from the target surface, along with measuring light scatted from the sphere as it exits the capillary. As discussed herein, the first laser and the second laser can be two separate units that provide separate coaxial lasers. Alternatively, it is understood that the first laser and the second laser can both be provided by the same unit, with the intensity and/or other parameters being adjustable or switchable between the steps of providing a first laser for illumination and a second laser for solder melting. Such a method allows for fine tuning of the thermal interconnect process by having the capability of adjusting the process parameters to more accurately place the solder in a desired location and allow for solder reflow at the desired time.

In processes of the invention, a solder sphere is released from a solder sphere dispenser into a central opening of a capillary that has one or more tapered walls or a tapered wall around its perimeter. In one embodiment, the central opening of the capillary comprises a top or first portion, a bottom or second portion extending from the top portion, with both the top and bottom portions being tapered toward an exit orifice. In another embodiment, the central opening of the capillary includes a tapered portion from which a barreled or cylindrical portion extends. The lower section of the capillary is generally larger than the sphere that will be entering it so that it falls almost unimpeded except for being constrained in the X-Y direction by the capillary walls. Prior to any sphere entering the capillary, a first or relatively low-powered laser is directed into the inner portion of the capillary and toward the surface(s) that are to be soldered (i.e., the target surface(s)). The light from the laser that is reflected off of the target surface(s) is measured with a photodetector that is positioned outside the capillary.

As the solder sphere moves into the capillary, the laser light that is directed through the capillary will be blocked, such that the intensity of the measured light will decrease. This transition to a lower intensity of measured light will trigger a second laser (which is generally coaxial to the first laser) to activate and heat the solder sphere as it falls through the capillary. This second laser provides sufficient energy to both melt the solder and cause the reflow process (i.e., the process that occurs when the solder begins to create the joint between adjacent components). Because the lower section is larger than the solder sphere that is moving through it, the solder sphere generally falls unimpeded such that it does not pause or stop at the exit orifice of the capillary. In this way, the life of the capillary from which the solder sphere is released can be increased, and the yield of a particular thermal interconnect process can also be improved.

Methods of the invention further include providing a delay period from the point at which the trigger threshold is reached by the change in light measured by the photoreceptor to the time when the second laser is activated, rather than immediately activating the second laser. In another method of the invention, a delay can be provided in activating the second laser so that when the solder sphere exits the capillary, a second trigger is activated to "ramp up" the laser power. In this way, the solder sphere will be heated but not melted while it is in the barreled or lower section of the capillary. Once this heated solder sphere exits the capillary, the photodetector will be able to detect reflected light energy from the solder sphere. When this reaches a predetermined level or upper threshold, the energy of the second laser can be further increased to apply sufficient energy to melt and reflow the solder sphere.

Referring now to FIGS. 3A-3F, schematic views of multiple steps of an exemplary existing method are illustrated for electrically connecting two orthogonal elements, such as a slider 100 and a trace gimbal assembly 102. These elements are generally associated with or extend from other elements of a hard disk drive components, wherein only a distal portion of such elements of are shown for clarity of illustration purposes. These components are attachable to each other using solder material that is provided to the soldering area in the area where the slider 100 and trace gimbal assembly 102 are closest to each other. It is noted that FIG. 4 is a graphical representation of the general amount of pressure in a capillary when a solder ball is positioned therein, as can be measured by a pressure monitor, along with the intensity of an applied laser over the various method steps of FIGS. 3A-3F. As such, FIG. 4 is positioned directly under the schematic views of FIGS. 3A-3F to correspond with the changes in pressure and laser intensity throughout the process.

A capillary 104 is positioned above the slider 100 and gimbal assembly 102 such that solder material exiting the capillary will fall toward two components that are to be electrically connected to each other. The capillary 104 includes a capillary pressure monitor 106 and a central opening 105 that is positioned such that its longitudinal axis is directly above the area onto which it is desired to deposit solder material. In this way, the solder sphere uses gravity, in addition to the pressure that is pushing the solder sphere from the capillary, to move a solder sphere 108 to its target location.

Figures 3A, 3B, 3C, 3D, 3E, 3F:
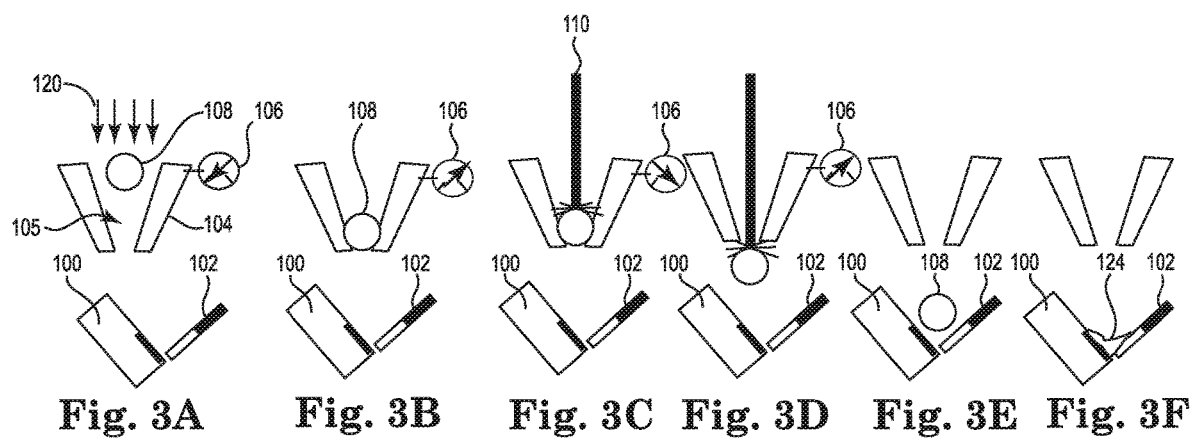
FIGS. 3A-3F provide a front schematic view of an embodiment of a series of steps for a soldering process conventionally used in the industry.
Figure 4:
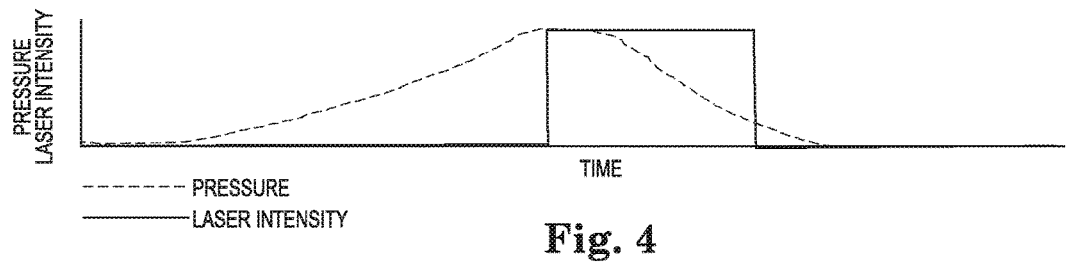
FIG. 4 is a graph illustrating an exemplary representation of a capillary pressure curve and laser intensity curve over the duration of the soldering process steps of FIGS. 3A-3F.

Referring initially to FIG. 3A, solder sphere 108 is provided to the capillary 104 from a solder sphere source or reservoir (not shown). Pressure is applied to the capillary 104, such as with a pressurization gas depicted schematically with arrows 120 as pressing downwardly against the solder sphere 108 until it is positioned at the outlet of the capillary 104, as is shown in FIG. 3B. Continued pressure is applied, which thereby increases the pressure within the capillary 104, as is being monitored by the pressure monitor 106. The increasing pressure between steps 3B and 3C is illustrated with the broken line 130 of FIG. 4.

Once the pressure is applied for a period of time, a laser pulse or jetting pulse 110 is directed to the solder sphere 108, as is illustrated schematically in FIG. 3C. FIG. 4 illustrates that the laser is applied at the point when the pressure reaches its highest level. The laser 110 is directed generally along a longitudinal axis that extends vertically from the center opening 105 of the capillary 104 and in a downward direction. The amount of energy provided by this laser is generally sufficient to bring the material of the solder sphere up to its semi-molten temperature. As the laser is applied, the solder sphere 108, which has been softened by the laser and is under pressure, can exit from the outlet of the capillary 104 as semi-molten solder material, as is illustrated in FIG. 3D. The pressure measured by the pressure monitor 106 will also decrease as the material exits the capillary 104, as is illustrated in FIG. 4.

The laser 110 continues to be applied to the solder sphere 108 as the sphere 108 exits the capillary 104 and is falling toward the components to be bonded, as is shown in FIG. 3D and by the graphical illustration of continued application of a laser from the step shown in FIG. 3C to the step shown in FIG. 3D. Application of the laser 110 is then removed (as graphically shown with the solid line of FIG. 4), while the solder sphere 108 continues to fall toward the components, as is illustrated schematically in FIG. 3E. The molten material then falls to the intersection of the components to be bonded, as is shown with the solder connection 124 illustrated in FIG. 3F.

FIGS. 5A-5F schematically illustrate an embodiment of a series of steps for a soldering process, in accordance with an embodiment of the invention. In each of these steps, a capillary 204 is illustrated as positioned above a slider 200 and gimbal assembly 202 such that solder material exiting the capillary 204 will fall toward these two components that are to be electrically connected to each other. It is noted that FIG. 6 is a graphical representation of the light reflected from the target solder area, as is measured by an optical detector, along with the laser intensity over the various method steps of FIGS. 5A-5F. As such, the graphical representation of FIG. 6 is positioned directly under the schematic views of FIGS. 5A-5F to correspond with the changes in reflected light and laser intensity throughout the process.

The capillary 204 can have a wide variety of different sizes and shapes; however, an embodiment of the capillary 204 used in the methods of the invention can include a structure that includes a center opening 205 that is at least partially surrounded by walls that are sloped or tapered from the area in which a solder sphere enters the capillary to a barreled section or portion 220 below a tapered area 207. With this and other embodiments of the invention, it is contemplated, however, that the inner portion of the capillary is tapered downwardly (at a constant or varied taper) from a top portion of the capillary to a bottom portion of the capillary. In the illustrated embodiment of FIGS. 5A-5F, the barreled section 220 is generally a tubular opening that extends from the tapered area 207 of the capillary 204 to a distal end 222 of the barreled section 220. The distal end 222 of the capillary includes an exit orifice from which solder sphere 208 can exit the capillary 204. That is, the capillary 204 can be substantially conic with a hollow inner area that includes both a proximal tapered area 207 and a distal tubular or barreled section 220.

The center opening 205 of capillary 204 is positioned such that a longitudinal axis 224 of the barreled section 220 is directly above the area onto which it is desired to deposit solder material. In this way, exact target locations can be selected for depositing of a solder sphere by precisely adjusting the location of the outlet of the capillary. In an embodiment where the target surfaces (e.g., surfaces of slider 200 and gimbal assembly 202) are perpendicular to each other, the angle between the longitudinal axis of the center opening 205 of the capillary 204 and the target surfaces can be approximately 45 degrees, although different angles that are larger or smaller than 45 degrees between the longitudinal axis 224 and the target surfaces are contemplated by the invention.

Figures 5A, 5B, 5C, 5D, 5E, 5F:
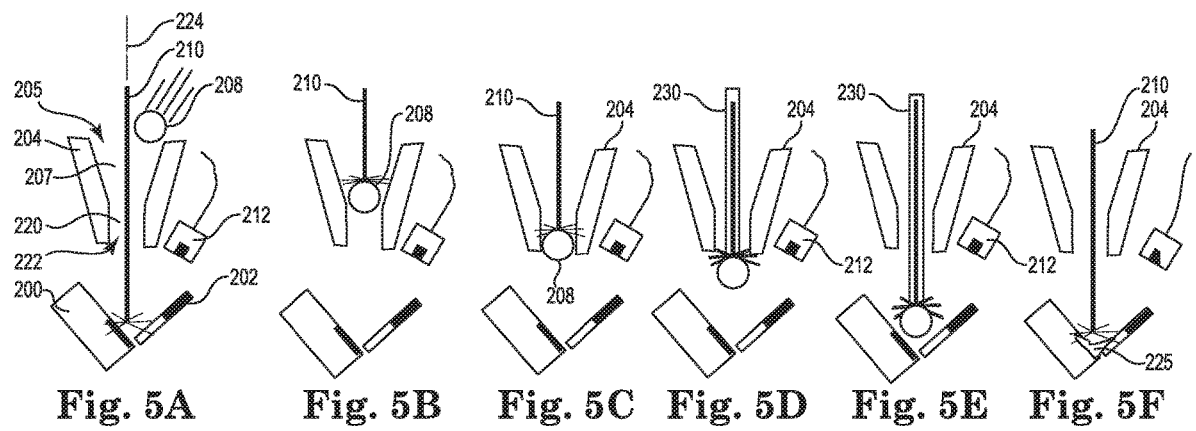
FIGS. 5A-5F provide a schematic view of an embodiment of a series of steps for a soldering process of the invention.
Figure 6:
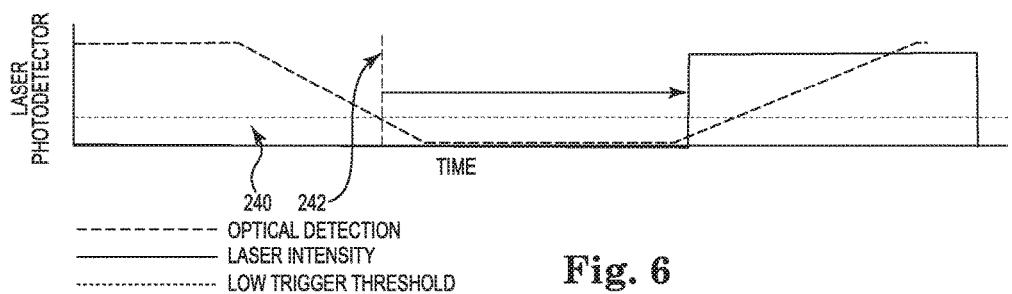
FIG. 6 is a graph illustrating an exemplary representation of an optical detection intensity curve and laser intensity curve over the duration of the soldering process steps of FIGS. 5A-5F, and further including a trigger threshold and a trigger delay.

With continued reference to FIG. 5A, a first laser 210 is directed along the longitudinal axis 224 of the capillary and generally toward the area in which solder material will be deposited. An optical detector or photodetector 212 is positioned outside the capillary 204 and positioned to measure light from the first laser 210 that is reflected from the surface(s) to be soldered prior to any solder material being dispensed. The first laser 210 can be a relatively low power laser that provides for reflective properties but that is not sufficiently strong to melt solder material, for example.

A quantity of solder material is then provided to the system for soldering of components, and is provided as a solder sphere 208 in an embodiment of the invention. It is noted that the term solder "sphere" is used throughout the present disclosure; however, it is understood that the solder may instead be provided as any number of shapes that are not spherical, such as elliptical or the like, and such shapes are considered to be within the scope of the invention for all of the embodiments provided herein. The solder sphere 208 is conveyed or dispensed to the capillary 204 from a solder source or reservoir (not shown), wherein the solder material, size, shape, and the like are selected to provide a desired connection between components once the solder material is placed and formed in a target location. In this particular embodiment, the solder sphere 208 is dispensed or projected toward a proximal opening of the capillary 204. The rate and angle at which the solder sphere 208 is dispensed is preferably designed and/or selected so that it can fall through the tapered portion of the capillary 204 with minimal contact or no contact with the capillary sidewalls. That is, the solder sphere 208 preferably falls unimpeded through the tapered area 207 as it approaches the barreled section 220 of the capillary 204. In an embodiment of the invention, the barreled section 220 is larger than the solder sphere or material entering it so that the solder sphere 208 can also fall through the barreled section 220 with minimal or no contact with its sidewalls.

With continued reference to the step of FIG. 5A, solder sphere 208 is dispensed to the tapered portion 205 of the capillary 204 from a solder sphere source or reservoir (not shown). Prior to or simultaneous to this release of the solder sphere from a solder sphere source, a first laser 210 is directed along the longitudinal axis 224 and toward the target area for the solder. However, the photodetector 212 is preferably measuring reflection from the target surface generated by the laser 210 prior to the solder sphere crossing into the area where it crosses the path of the laser 210. Thus, the amount of reflected laser light detected by the photodetector will be relatively high, as is illustrated schematically in FIG. 6 in the area directly below FIG. 5A.

As the solder sphere 208 moves further toward the inlet of the capillary 204, it will cross the path of laser 210. This interference between the laser 210 and the solder sphere 208 will cause a decreasing amount of reflected light to be detected or measured by the photodetector 212, as is illustrated by the broken line of FIG. 6 in the area corresponding with FIGS. 5A to 5B. That is, the decrease in reflected light is graphically illustrated by the downward slope shown in FIG. 6 of the optical detection between the steps of FIG. 5A and FIG. 5B. Once the amount of measured light reaches a low trigger threshold (represented by the dotted line 240), a trigger delay is initiated, as is represented by vertical line 242 of FIG. 6 that corresponds to the beginning of the step of FIG. 5C. As shown, the amount of light detected by the photodetector 212 during this time will be minimal or zero.

After a predetermined trigger delay time has passed, a second laser 230 is applied along the same longitudinal axis 224 as the application of the first laser 210. The laser 230 will continue to be applied to the solder sphere 208 for a certain amount of time, as is shown graphically in the portion of FIG. 6 corresponding with steps 5D-5E. The second laser 230 provides sufficient energy to initially bring the material of the solder sphere up to its semi-molten temperature, and then to further heat it to the temperature necessary for the bonding and reflow process. As the laser is applied, the solder sphere 208 will be exiting from the outlet of the capillary 204 as a semi-molten solder material, as is illustrated in FIG. 5D. As the material exits the capillary 204, the amount of light detected by the photodetector 212 will increase (since light will again reach the target area and be reflected from it). The amount of time that the laser 230 is applied can be controlled by the measurement of this reflected light (e.g., the laser turns off when the reflected light increases to a certain value) and/or by waiting a predetermined amount of time from when the laser begins to be applied.

Application of the laser 230 is then removed (as graphically shown with the vertical solid line of FIG. 6 that corresponds with the time between the steps of FIGS. 5E and 5F), while the solder sphere 208 continues to fall toward the components, as is illustrated schematically by FIG. 5E. The molten material then falls to the intersection of the components to be bonded, as is shown with the solder connection 225 illustrated in FIG. 5F. The first laser 210 can continue to be applied, however, with the photodetector 212 continuing to detect the reflected light from the solder area.

FIGS. 7A-7F schematically illustrate another embodiment of a series of steps for a soldering process, in accordance with an embodiment of the invention. In each of these steps, a capillary 304 is illustrated as positioned above a slider 300 and a trace gimbal assembly 302 such that solder material exiting the capillary 304 will fall toward these two components that are to be electrically connected to each other. It is noted that FIG. 8 is a graphical representation of the light reflected from the target solder area, as is measured by an optical detector, along with the laser intensity over the various method steps of FIGS. 7A-7F. As such, the graphical representation of FIG. 8 is positioned directly under the schematic views of FIGS. 7A-7F to correspond with the changes in reflected light and laser intensity throughout the process.

The capillary 304 can have a wide variety of different sizes and shapes; however, an embodiment of the capillary 304 used in the methods of the invention can include a structure that includes a center opening 305 that is at least partially surrounded by walls that are sloped or tapered from the area in which a solder sphere enters the capillary to a barreled section or portion 320 below a tapered area 307. The barreled section 320 is generally a tubular opening that extends from the tapered area 307 of the capillary 304 to a distal end 322 of the barreled section 320. The distal end 322 of the capillary includes an exit orifice from which solder sphere 308 can exit the capillary 304. That is, the capillary 304 can be substantially conic with a hollow inner area that includes both a proximal tapered area 307 and a distal tubular or barreled section 320.

The center opening 305 of capillary 304 is positioned such that a longitudinal axis 324 of the barreled section 320 is directly above the area onto which it is desired to deposit solder material. In this way, exact locations can be selected for moving a solder sphere to its target location by precisely adjusting the location of the outlet of the capillary. In an embodiment where the target surfaces (e.g., surfaces of slider 300 and gimbal assembly 302) are perpendicular to each other, the angle between the longitudinal axis of the center opening 305 of the capillary 304 and the target surfaces can be approximately 45 degrees, although different angles that are larger or smaller than 45 degrees between the longitudinal axis 324 and the target surfaces are contemplated by the invention.

Figures 7A, 7B, 7C, 7D, 7E, 7F:
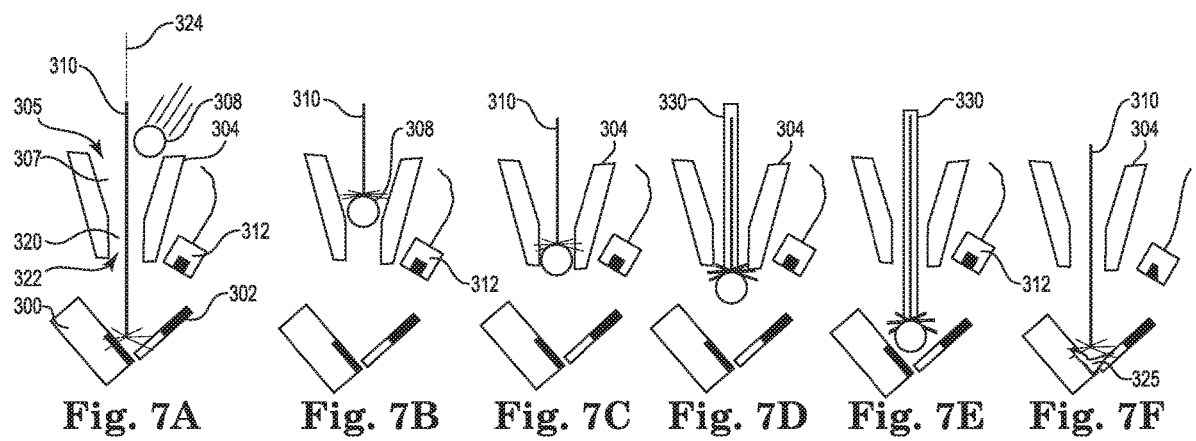
FIGS. 7A-7F provide a schematic view of another embodiment of a series of steps for a soldering process of the invention.
Figure 8:
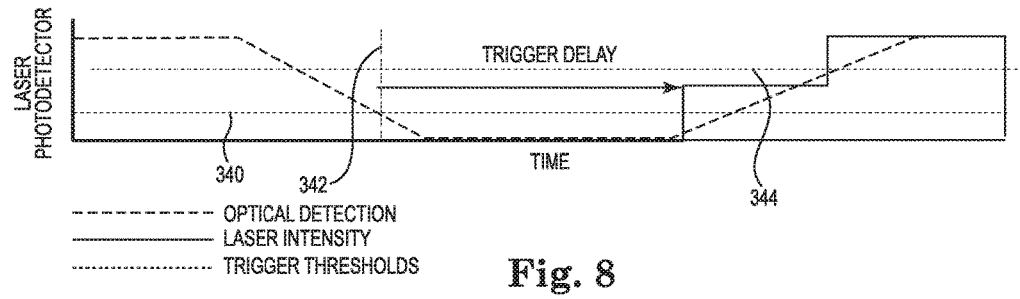
FIG. 8 is a graph illustrating an exemplary representation of an optical detection intensity curve and laser intensity curve over the duration of the soldering process steps of FIGS. 7A-7F, and further including low and high trigger thresholds and a trigger delay.

With continued reference to FIG. 7A, a first laser 310 is directed along the longitudinal axis 324 of the capillary and generally toward the area in which solder material will be deposited. An optical detector or photodetector 312 is positioned outside the capillary 304 and positioned to measure light from the first laser 310 that is reflected from the surface(s) to be soldered prior to any solder material being dispensed. The first laser 310 can be a relatively low power laser that provides for reflective properties but that is not sufficiently strong to melt solder material, for example.

A quantity of solder material is then provided to the system for soldering of components, and is provided as a solder sphere 308 in an embodiment of the invention. The solder sphere 308 is conveyed or dispensed to the capillary 304 from a solder source or reservoir (not shown), wherein the solder material, size, shape, and the like are selected to provide a desired connection between components once the solder material is placed and formed in a target location. In this particular embodiment, the solder sphere 308 is dispensed or projected toward a proximal opening of the capillary 304. The rate and angle at which the solder sphere 308 is dispensed is preferably designed and/or selected so that it can fall through the tapered portion of the capillary 304 with minimal contact or no contact with the capillary sidewalls. That is, the solder sphere 308 preferably falls unimpeded through the tapered area 307 as it approaches the barreled section 320 of the capillary 304. In an embodiment of the invention, the barreled section 320 is larger in width than the solder sphere or material entering it so that the solder sphere 308 can also fall through the barreled section 320 with minimal or no contact with its sidewalls.

With continued reference to the step of FIG. 7A, solder sphere 308 is dispensed to the tapered portion 305 of the capillary 304 from a solder sphere source or reservoir (not shown). Prior to or simultaneous to this release of the solder sphere from a solder sphere source, a first laser 310 is directed along the longitudinal axis 324 and toward the target area for the solder. However, the photodetector 312 is preferably measuring reflection from the target surface generated by the laser 310 prior to the solder sphere crossing into the area where it crosses the path of the laser 310. Thus, the amount of light detected by the photodetector will be relatively high, as is illustrated schematically in FIG. 8 in the area directly below FIG. 7A.

As the solder sphere 308 moves further toward the inlet of the capillary 304, it will cross the path of laser 310. This interference between the laser 310 and the solder sphere 308 will cause a decreasing amount of reflected light to be detected or measured by the photodetector 312, as is illustrated by the broken line of FIG. 8 in the area corresponding with FIGS. 7A to 7B. That is, the decrease in reflected light is graphically illustrated by the downward slope shown in FIG. 8 of the optical detection between the steps of FIG. 7A and FIG. 7B. Once the amount of measured light reaches a low trigger threshold (represented by the dotted line 340), a trigger delay is initiated, as is represented by vertical line 342 of FIG. 8 that corresponds to the beginning of the step of FIG. 7C. As shown, the amount of light detected by the photodetector 312 during this time will be minimal or zero since the solder ball is blocking the laser light from reaching the target area.

After a predetermined trigger delay time has passed, a second laser 330 is applied along the same longitudinal axis 324 as the application of the first laser 310. The second laser 330 will continue to be applied to the solder sphere 308 for a certain amount of time, as is shown graphically in the portion of FIG. 8 corresponding with steps 7D-7E. The second laser 330 provides sufficient energy to initially bring the material of the solder sphere up to its semi-molten temperature, and then to further heat it to the temperature necessary for the bonding and reflow process. As the laser is applied, the solder sphere 308 will be exiting from the outlet of the capillary 304 as a semi-molten solder material, as is illustrated in FIG. 7D. As the material exits the capillary 304, the amount of light detected by the photodetector 312 will increase (since light will again reach the target area and be reflected from it). In this embodiment, once the reflected light increases to a certain value, illustrated by secondary trigger threshold 344, the laser intensity is increased to a higher level.

Application of the laser 330 is then removed (as graphically shown with the vertical solid line of FIG. 8 that corresponds with the time between the steps of FIGS. 7E and 7F), while the solder sphere 308 continues to fall toward the components, as is illustrated schematically by FIG. 7E. The molten material then falls to the intersection of the components to be bonded, as is shown with the solder connection 325 illustrated in FIG. 7F. The first laser 310 can continue to be applied, however, with the photodetector 312 continuing to detect the reflected light from the solder area.

With any of the methods described herein, it is contemplated that the laser providing the light for reflection and detection and the laser providing the heating of the solder sphere are coaxial or non-coaxial or the same laser. In addition, in the methods that involve photo detection, it is contemplated that the solder sphere is detected using differing techniques, such as a thermal camera, for example.

Figure 9:
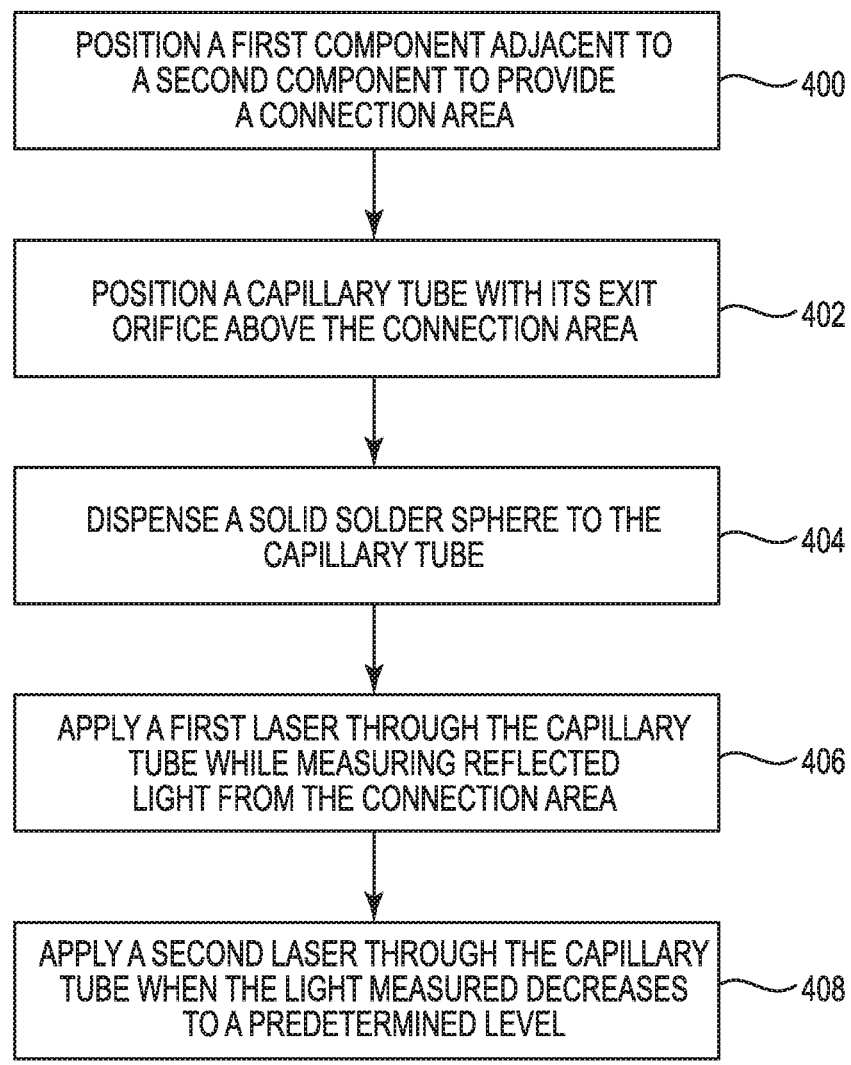
FIG. 9 is a flowchart illustrating steps of an exemplary soldering process of the invention.

Referring now to the flowchart of FIG. 9, an exemplary method of the invention is provided for interconnecting multiple components of an electrical assembly with a solder joint, such as a slider and suspension components of a hard disk drive, as is described herein. The method includes a step 400 of initially positioning a first component adjacent to a second component to provide a connection area in which the solder will be deposited, such as is illustrated in FIGS. 5A-5F and 7A-7F, for example. Then in step 402, a capillary tube is positioned with its exit orifice above the connection area and a solid solder sphere is then dispensed to the capillary tube, per step 404. A first laser is then applied through the capillary tube while light being reflected from the connection area is being measured, such as by a photodetector, per step 406. Once the measured light decreases to a predetermined level (due to the sphere blocking the reflection of light from the connection area), a second laser is applied, per step 408.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of interconnecting multiple components of an electrical assembly with a solder joint, comprising the steps of:
    positioning a first component adjacent to a second component to provide a connection area between the first and second components;
    dispensing a solid solder sphere to a capillary tube comprising a first portion, a second portion extending downwardly from first portion, and an exit orifice at a distal end of the second portion, wherein the capillary tube is positioned with the exit orifice above the connection area between the first and second components;
    applying a first laser through the capillary tube while measuring light from the first laser that reflects off the connection area as the solder sphere moves through the capillary tube and until the measured light reaches a predetermined level; and applying a second laser to at least partially melt the solder sphere after the measured light decreases to the predetermined level and as the solder sphere falls from the exit orifice toward the connection area between the first and second components.

2. The method of claim 1, wherein the measured light is detected with a photodetector positioned external to the capillary tube.

3. The method of claim 1, wherein the first laser is coaxial to a longitudinal axis of a barreled section of the capillary tube.

4. The method of claim 1, wherein the step of applying a second laser comprises varying an intensity of the first laser.

5. The method of claim 1, wherein the electrical assembly comprises a head-gimbal assembly, wherein the first component comprises a slider, and wherein the second component comprises a trace gimbal assembly.

6. The method of claim 1, wherein the first and second lasers are coaxial.

7. The method of claim 1, wherein the first component is positioned at an angle relative to the second component.

8. The method of claim 1, wherein the first portion of the capillary tube comprises a tapered inner opening.

9. The method of claim 1, wherein the second portion of the capillary tube comprises a barreled inner opening.

10. The method of claim 1, wherein the second portion of the capillary tube comprises a cylindrical inner opening.

11. The method of claim 1, wherein an inner opening of the first and second portions of the capillary tube are tapered.

12. The method of claim 1, further comprising the step of initiating a trigger delay after the measured light reaches the predetermined level.

13. The method of claim 1, wherein the step of applying a second laser comprises applying varying levels of laser power.

14. The method of claim 13, wherein a first level of laser power is applied first and then a second level of laser power is applied, wherein the first level is lower than the second level.

15. The method of claim 14, further comprising measuring light from the second laser that reflects off the connection area, wherein the laser power increases from the first level to the second level when the measured light reaches a second laser threshold level.

* * * * *